UNITED STATES PATENT OFFICE.

CARL V. PETRAEUS, OF JOPLIN, MISSOURI, ASSIGNOR TO OLIVER H. PICHER, OF SAME PLACE.

PROCESS OF REFINING BASE BULLION.

SPECIFICATION forming part of Letters Patent No. 515,164, dated February 20, 1894.

Application filed May 22, 1891. Serial No. 393,753. (No specimens.)

*To all whom it may concern:*

Be it known that I, CARL V. PETRAEUS, of Joplin, county of Jasper, State of Missouri, have invented a certain new and useful Improved Process of Refining Base Bullion, of which the following is a true and exact description.

My invention relates to the recovery of the precious metals from base bullion and has for its object the treatment of such bullion in a way at once efficient and economical.

My improved process is as follows: I melt the bullion heating it to about the melting point of zinc and to the fused mass I add zinc preferably, though not necessarily, in a molten state and thoroughly stir it into the mass. The proportion of zinc will depend somewhat on the silver present with one hundred ounces of silver to the ton of lead I have used two per cent. of spelter. The stirring action should be continued about half an hour and the metal is then allowed to cool down somewhat in the course of which cooling a crust or scum of zinc carrying the silver, gold and copper originally in admixture with lead will form on top of the bath. This scum is removed as it forms by means of a perforated ladle. The zinc scum is next charged into a smelting furnace, preferably a low cupola furnace together with an ordinary base bullion charge or a refuse charge of such character as will not form a slag which will flux the zinc. The composition of the charge will vary greatly with the ores treated. The ingredients should be such as will produce a slag containing, say, about thirty per cent. silver, thirty-five per cent. ferrous oxide, twenty-two per cent. lime, and thirteen per cent. of zinc lead, &c., or the equivalents of said ingredients; if highly zincky ore is used, the slag may advantageously be made more basic. The proper ingredients to use in order to produce such a slag will be obvious to a skilled smelter knowing the nature of the ores under treatment. When so treated the zinc in the charge is oxidized and driven off as zinc oxide fumes which fumes I condense in bags in the well-known manner such for instance as is described in the patent to G. T. Lewis, dated July 27, 1886, No. 346,114. The condensed fumes may be sold as a pigment. The bullion having been freed from zinc is drawn off in the usual way and the precious metals obtained by cupellation. As some lead and silver are volatilized in the process of cupellation I prefer to provide bag condensers to condense and save these fumes as well as those driven off from the low cupola furnace.

It is practically impossible to remove all the zinc from the original base bullion after the first treatment mentioned; I therefore treat the desilverized lead which is best first granulated, in a low cupola furnace provided with bag condensers which will catch and save the zinc oxide fumes driven off from it in the course of that treatment. The lead tapped off from the furnace being entirely free from zinc.

From the above description it will be at once seen that my process is an improvement upon what is familiarly known as the Parkes's process; in which process however the zinc scum is heated to distill off the zinc and the desilverized lead is freed from zinc by heating in a reverberatory furnace or softening pan where it is melted and the zinc removed by careful skimming. These treatments are very expensive and it has been proposed to cheapen the process by treating both the desilverized lead and zinc scum in a cupola furnace in admixture with silica and tap cinders in order to flux the zinc which is drawn off with the slag and lost.

By my process it will be noted the zinc is drawn off in the form of zinc oxide fumes which are condensed and saved in the usual way, the loss of the zinc being thus avoided and the cost of saving it being greatly reduced as compared with the methods heretofore practiced.

Having now described my invention, what I claim as new, and desire to secure by Letters Patent, is—

1. The improvement in the process of refining base bullion which consists in melting the bullion and mixing it with metallic zinc, removing the zinc scum carrying precious metals from the desilverized lead, treating the zinc scum in a smelting furnace in admixture with base bullion charge or refuse charge of such character that the slag will not materially flux the zinc, thus oxidizing the zinc and driving off fumes of zinc oxide at the same time the bullion is brought to a fit state for cupellation, condensing the zinc oxide fumes in bags, and cupellating the bullion product.

2. The improvement in the process of refining base bullion which consists in melting the bullion and mixing it with metallic zinc, removing the zinc scum carrying precious metals from the desilverized lead, treating the zinc scum in a smelting furnace in admixture with base bullion charge or refuse charge of such character that the slag will not materially flux the zinc, thus oxidizing the zinc and driving off fumes of zinc oxide at the same time the bullion is brought to a fit state for cupellation, condensing the zinc oxide fumes in bags, cupellating the bullion product, and condensing the zinc oxide fumes driven off in cupellation in bags.

3. The improvement in the process of refining base bullion which consists in melting the bullion and mixing it with metallic zinc, removing the zinc scum carrying precious metals from the desilverized lead, treating the zinc scum and desilverized lead independently in smelting furnaces in charges which will not flux the zinc and condensing the zinc oxide fumes in bags.

CARL V. PETRAEUS.

Witnesses:
CLARK CRAYCROFT,
W. A. HACKER.